June 5, 1962 K. J. KNUDSEN 3,038,137
POTENTIOMETER DEVICE
Filed Feb. 23, 1960 2 Sheets-Sheet 1

INVENTOR.
Knud J. Knudsen
BY H. Gibner Lehmann
AGENT

June 5, 1962  K. J. KNUDSEN  3,038,137
POTENTIOMETER DEVICE
Filed Feb. 23, 1960  2 Sheets-Sheet 2
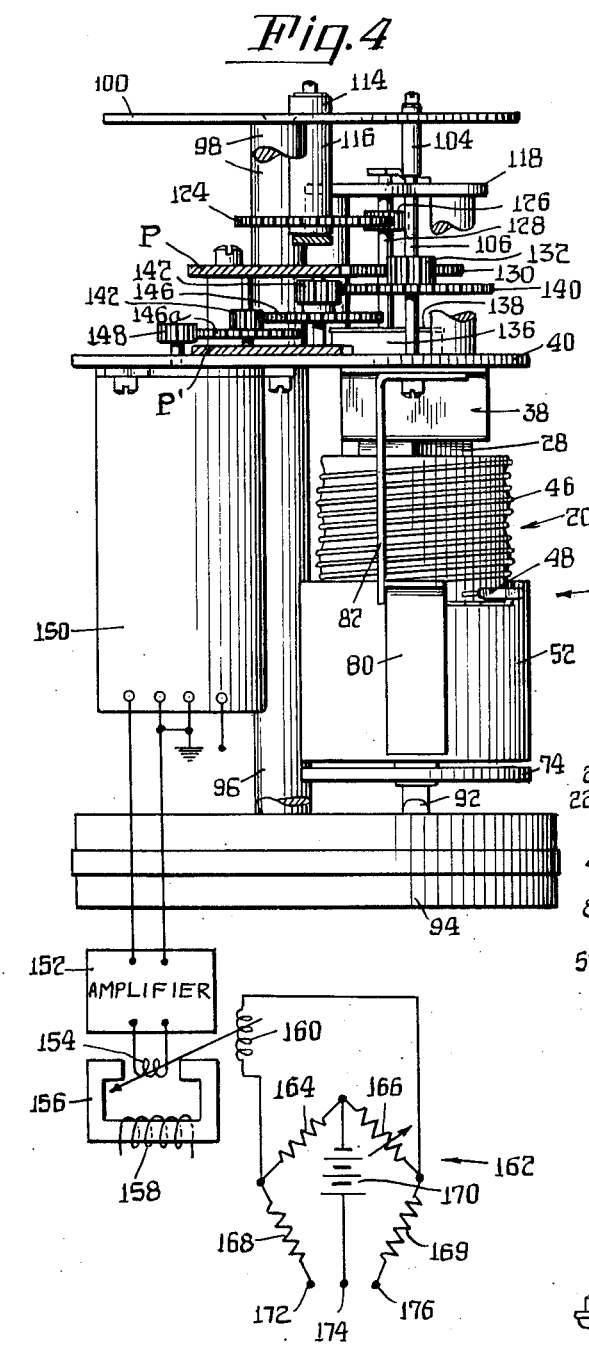
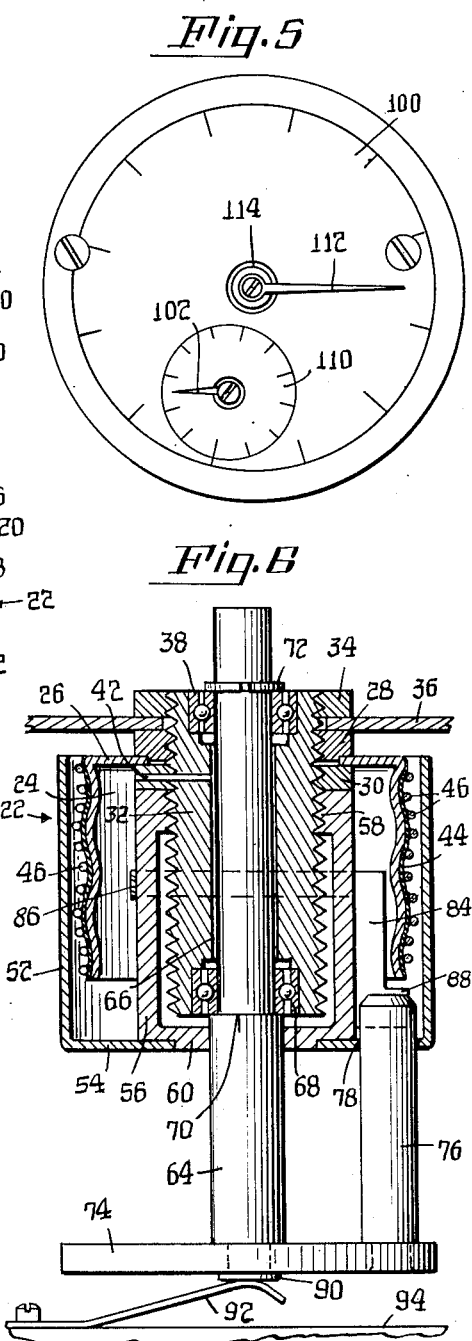
INVENTOR.
Knud J. Knudsen
BY H. Gibner Lehmann
AGENT United States Patent Office 3,038,137
Patented June 5, 1962

3,038,137
POTENTIOMETER DEVICE
Knud J. Knudsen, Naugatuck, Conn., assignor to Lewis Engineering Company, Naugatuck, Conn., a corporation of Connecticut
Filed Feb. 23, 1960, Ser. No. 10,354
8 Claims. (Cl. 338—143)

This invention relates to potentiometer systems or devices, and more particularly to devices of this type wherein an indication and/or control is effected automatically through the use of a potentiometer unit involving a length of resistance wire and a slider or contact adapted to engage and traverse the said wire so as to alter resistance values in an electrical circuit of the system.

An object of the invention is to provide a novel and improved combination indicating and/or control electrical circuit incorporating a potentiometer type unit or instrument, wherein variable quantities which change in value over a relatively wide range may be adequately handled for the purposes of effecting either a control or an indication, or both.

Another object of the invention is to provide an improved potentiometer system or circuit and unit instrument as above set forth, which is extremely sensitive in its response and is further responsive to relatively small or minute changes in the variable which is involved.

A further object of the invention is to provide an improved potentiometer type instrument or unit for use with a control and/or indicating circuit, which unit is responsive to a very wide range of values of the variable while at the same time responding to relatively small or minute variations thereof and being capable of providing small increments of resistance.

A still further object of the invention is to provide a novel multi-turn potentiometer unit employing a resistance coil of substantially helical configuration which unit is of extremely simple construction and involves but few components capable of being economically fabricated and assembled while at the same time the unit is reliable in its operation.

Still another object of the invention is to provide a novel multi-turn potentiometer unit of wide range and sensitive response to small variations as above outlined, wherein an easily read indicating means of the multi-scale type is utilized, to enable accurate readings of small changes to be had throughout an extended range of values.

A feature of the invention resides in the provision of a novel helical coil part in a potentiometer type instrument, wherein different diameters are provided for different convolutions of the coil, to enable compensation to be effected for non-uniform factors involving characteristics of components and the circuitry, temperature-resistance values, etc. with the result that the scale may be made uniform.

Other features and advantages will hereinafter appear.

In the drawings accompanying this specification similar characters of reference are used wherever possible to designate like components throughout the several views, in which:

FIG. 4 is an elevational view of the potentiometer unit, as seen from the left side of the unit illustrated in FIG. 1.

FIG. 5 is a top plan view of the dial and indicator pointers of the potentiometer unit.

FIG. 6 is a fragmentary view, partly in vertical section and partly in elevation, showing the interior construction of the potentiometer coil unit and traversing means.

Figure 1:
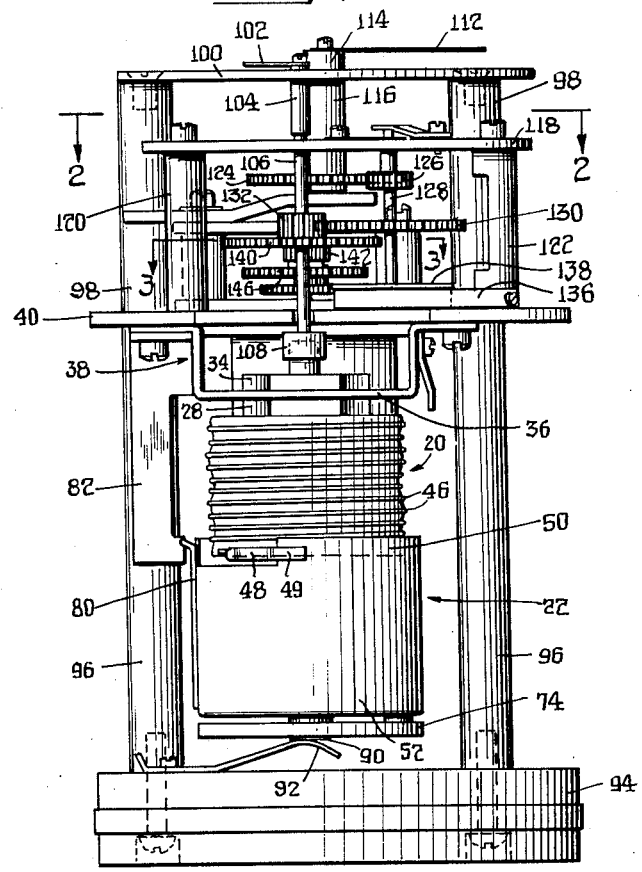
FIGURE 1 is a side elevational view of the improved potentiometer unit or instrument as provided by the invention.
Figure 2:
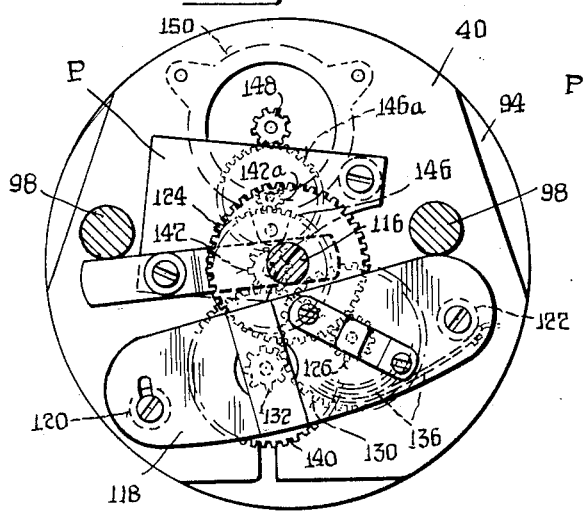
FIG. 2 is a horizontal sectional view, taken on the line 2—2 of FIG. 1.

FIGS. 1, 4 and 6 illustrate the multi-turn potentiometer unit and associated indicating means as provided by the invention. The potentiometer unit comprises essentially a multi-turn resistance-wire coil part indicated generally by the numeral 20, and a cooperable electrical brush part which is engageable with the coil part and which is indicated generally at 22. Further, the potentiometer unit comprises a connector or mounting means which movably connects the coil and brush parts with each other, to enable relative traversal of one part by the other. The said mounting means is characterized by cooperable screw threaded members associated respectively with the coil part and the brush part, said members having a pitch distance or value equal to the pitch of a helical coil of the wire coil part, in an arrangement whereby relative turning between the coil part and the brush part will also effect a slow axial displacement between the said parts by which traversal of the coil by the brush may be accomplished. In other words, the mounting means provides for movement of the brush in a helical path corresponding to the helix of the wire coil, thereby to enable the brush to glide over the surface of the coil in a direction which is both circumferential and axial, and is essentially longitudinal of the wire itself.

Referring to FIG. 6, the resistance-wire coil part 20 is shown as advantageously constituted of a drum-like coil form 24 having a transverse end wall 26 whereby it is in the nature of an inverted cup. The end wall 26 of the coil form has a large central aperture, and is carried between a pair of clamping nuts 28 and 30 which are threaded on a central screw member 32 constituting part of the mounting means between the coil part and the brush part.

A third nut 34 is carried by the screw 32 for the purpose of clamping the screw to a supporting wall 36, which, as shown in FIG. 6, constitutes a portion of a mounting bracket 38 secured to the underside of a circular transverse wall 40 comprising a supporting structure of the movement or unit.

As seen in FIG. 6, the positioning of the nuts 30, 28 and 34 may be fixed by means of one or several dowel pins 42 carried in aligned bores in the nut 30 and the screw 32.

By the above organization, the screw 32 constituting a portion of the mounting means of the two potentiometer unit parts is disposed within the coil part 20 and is concentric therewith. The coil form 24 may be constituted of metal, as for example brass or the like, and may have its exterior surface provided with an insulating coating or sleeve 44, on which the wire coil 46 is wound in a helical configuration.

The electrical brush part comprises a brush proper 48 in the form of a leaf spring, having one end 49 secured to the rim portion 50 of a drum-like member 52 having a diameter larger than that of the coil 46 and arranged to extend around the said coil in spaced relationship thereto. The member 52 constitutes a brush carrier for the brush 48, and has a transverse end wall 54 which is secured to a threaded nut member 56, the said nut member being in the form of a cylinder having inwardly extending flanges 58 and 60 at its ends respectively. The end flange 58 has internal screw threads, and is adapted to be screwed onto the lead screw 32 as shown in FIG. 6, whereby the nut member 56 constitutes a portion of the mounting means provided between the coil part and the electrical brush part of the potentiometer unit.

Preferably, as shown in FIG. 6, the end flange 60 has an annular shoulder arranged to be engaged by the circular edge of the central aperture of the end wall 54 of the brush carrier 52, thereby to accurately position the brush carrier on the nut part.

As seen in FIG. 4, the brush 48 is arranged to engage the outer surfaces of the convolutions of the coil 46, and with the organization as provided above relative turning movement of the brush part 22 with respect to the coil part 20 may take place, such turning movement being accompanied by a relative axial movement of the brush part whereby the brush 48 is caused to travel in a helix which corresponds to the helix of the coil 46. In effecting this, the pitches of the screw 32 and the nut-flange 58 correspond to the pitch of the helix represented by the coil 46.

Further, in accordance with the present invention, a novel and simplified actuator or transmission means is provided, by which relative turning movement of the coil and brush parts may be effected together with a desirable steadying or stabilizing of these parts for all adjusted positions thereof. The said actuator or transmission means, for this purpose, include bearing elements engageable with the coil part and the brush part, to maintain the concentricity of these parts.

As seen in FIG. 6, the actuator and transmission means comprises a driving shaft 64 passing through the central bore provided in the screw 32, said shaft being supported by bearing bushings 68 carried by the screw, as shown. The shaft has a positioning shoulder 70 and also a retainer ring 72 by which it is prevented from having axial movement.

At its lower extremity, the transmission shaft 64 carries a driving disc 74 on the peripheral portion of which there is mounted a driving lug or pin 76 arranged to be parallel with the shaft 64 and to be received in a recess 78 provided in the end wall 54 of the brush carrier drum 52. The shaft 64 passes through the central aperture defined by the flange 60 so as to have a snug sliding fit therewith, and by such organization a bearing is provided for the nut member 66, which effectively stabilizes the same and prevents any tendency for binding of the member with the threads of the screw 32. As the nut member 56 and the brush carrier drum 52 are turned and shifted axially the flange 60 will travel along the transmission shaft 64 without relative turning, due to the fact that the shaft is keyed to the brush carrier 52 by the driving lug 76 and recess 78. A stable two-point bearing is thus provided for the nut part 56 by the two end flanges 58 and 60 thereof, the flange 58 being internally threaded and travelling along the screw 32.

As the shaft 64 is turned, driving with it the brush carrier 52 the latter and the nut member 56 will move axially downward under the action of the threads of the screw 32, and the transverse wall 54 of the brush carrier will axially traverse the shaft 64 and the driving pin 76. However, the driving pin will not move axially with respect to the coil form 24 and coil 46, by virtue of the bearing provided for the shaft 64 within the screw 32.

Considering FIG. 4, the coil part 20 will thus remain stationary in the position shown, whereas the brush part comprising the brush 48 and carrier 52 will be turnable and also advanceable vertically upward from the position shown, until the brush carrier 52 virtually completely encloses the coil 46 with the brush 48 engaged with the uppermost convolution of said coil.

To limit the downward movement of the brush part 22, the brush carrier 52 is provided with a stop lug 80 engageable with a fixed stop member 82 mounted under and depending from the transverse end wall 40 of the unit. Upon the brush carrier 52 making one revolution in a counterclockwise direction as viewed from the top of the unit shown in FIG. 1, the stop lug 80 will be raised above the corresponding stop 82 by almost the pitch distance of the screw 32, whereupon continued movement of the brush carrier and brush may take place.

The helical coil 46 may have any number of turns, and may be either closely spaced or widely spaced. An advantageous construction involves the provision of ten complete turns in making the coil 46. As seen in FIG. 6, a connection may be established to the brush 48 in the following manner: The nut part 56 may be provided with a leaf spring 84 having a semi-circular mounting or base portion 86 secured to the outer peripheral surface of the part 56. The spring 84 has a depending portion at the lower extremity of which there is a lug or finger 88 engaging the uppermost extremity of the driving pin 76 as seen in FIG. 6. The underside of the driving disc 74 may have a contact button 90, which is engaged by a leaf spring contact 92, the latter being carried by an end plate 94 of the unit. As seen in FIG. 1, vertical posts 96 may secure the end plate 94 to the transverse end wall 40, and additional posts 98 may mount a circular indicating dial in spaced relation above the wall 40.

In accordance with the invention a simple and advantageous indicator means is provided, including the dial plate 100, by which easily read indications may be had of values of a variable corresponding to different relative rotative positions of the coil part 20 and the brush part 22. By the provision of the coil 46 having a large number of turns, together with the organization whereby the brush 48 is made to travel longitudinally of the wire itself which makes up the coil, a wide range of values of the said variable may be covered and indicated by the present improved potentiometer unit in accordance with the invention, while at the same time the response and indication of the unit is essentially stepless whereby very small variations or minute changes in the variable may be indicated and read, or else utilized to effect a control. As an example, temperatures within a range as great as 1000° C. may be readily indicated.

In enabling the reading of small variations or increments in conjunction with a relatively large range of values, the invention provides in conjunction with the multi-turn coil part 20 and brush part 22 an indicating pointer 102 arranged to be drivingly connected to the transmission shaft 64 so as to indicate at all times the rotative position of the said shaft. The pointer 102 may be carried by a sleeve member 104 which is slipped over a connector shaft 106 secured in a bushing 108 which latter is mounted on top of the transmission 64. A 360° scale 110 covering a 100° C. range may be provided for the pointer 102 as shown, and the said scale may be provided with divisions or graduations numbered in any desired manner, as in 10° steps, to indicate the values of the variable. A second pointer or index means 112 is provided, located at the center of the large dial 100 and arranged to have a deflection path over the said dial. The dial 100 is provided with spaces or graduations which are equal in number to the number of convolutions of the helical coil 46, and may cover a 1000° C. range, with each graduation representing a 100° step, whereby each coil convolution would represent 100° C. The pointer 112 is carried on a hub 114 mounted on a shaft 116 which passes through and bears in the dial plate 100 and also has a bearing in a small bearing plate 118 mounted by means of short posts 120 and 122 on the transverse wall 40 of the unit. Below the bearing plate 118 and tops of the posts 120 and 122 the shaft 116 has a spur gear 124 meshing with a pinion 126 carried on a jack shaft 128 which has a gear 130 meshing with a pinion 132 on the connector shaft 106. A ratio of 12 to one or so is thus established between the shafts 106 and 116, whereby ten revolutions of the pointer 102, corresponding to a complete traversal of the coil 46 by the brush 48, will effect somewhat less than one complete revolution of the pointer 112. The portion of the scale 100 which is covered by the pointer 112 for ten complete revolutions of the pointer 102 may be subdivided into 100° C. divisions each corresponding to one turn of the pointer 102, and to effect the 100° values with scale uniformity different convolution diameters of the coil 46 are employed, as will be later described. Thus, by reading the two pointers 102 and 112 a stepless indication of the value of the variable may be had throughout the entire range of movement of the brush 48 and brush carrier 52.

In conjunction with the indicating and control potentiometer circuit, a motive means is provided for effecting bi-directional turning movement of the brush carrier 52 and the brush 48 in response to changes in the variable associated with the circuit. Also, an opposing biasing means is provided as regards movement in one direction, for effecting a unidirectional return movement of the brush carrier and brush when the motive means is not energized and the unit is not being used. The biasing device, in the illustrated embodiment of the invention, comprises a spiral coil spring which is confined between the transverse wall 40 and a retainer disc 138 fixedly mounted on the jack shaft 128. The inner end of the spiral spring 136 is affixed to the jack shaft 128, and the action of the spring is such as to normally retain the brush carrier 52 and the brush 48 in the lowermost position as illustrated in FIG. 1 (with motive means unenergized).

Figure 3:
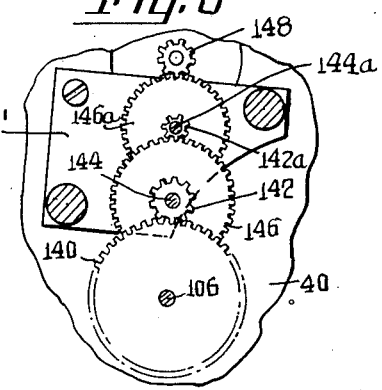
FIG. 3 is a fragmentary horizontal sectional view, taken on the line 3—3 of FIG. 1.

For the purpose of effecting upward and downward traversing movements of the coil 46 by the brush 48, the upward movement opposing the action of the coil spring 146, opposite driving forces are imparted to the connector shaft 106. As shown in FIG. 3, the connector shaft 106 has a gear 140 meshing with a pinion 142 carried by a second jack shaft 144, the latter having a gear 146 meshing with a pinion 142a on a shaft 144a having a gear 146a meshing with a pinion 148 which is carried by the shaft of a reversible electrical motor 150 mounted between the wall 40 and the end plate 94 of the potentiometer unit. The shafts 144 and 144a bear in plates P and P¹, see FIGS. 3 and 4.

In accordance with the invention, the scales 100 and 110 may be made to have uniformly spaced graduations by compensating for variable factors involving for instance not the resistance of the wire coil 46 but the characteristics of the components and circuit associated therewith. Such compensation is effected, in accordance with the invention, by making the coil form 24 so that it has a non-uniform diameter whereby certain of the convolutions, of the coil 46 will have a smaller diameter than other convolutions, as shown in FIG. 6. Accordingly, the resistance per turn of the coil 46 will not be uniform but instead may have various predetermined or desired values and the diameters of the convolutions may thus be utilized to provide a compensation for non-uniform or non-linear factors whereby unformity of the scales may result.

A simple amplifier and control circuit organization involving the potentiometer unit of FIGS. 1 and 4, is given partly schematically and partly in block form in FIG. 4. In this figure, the block 152 indicates an amplifier which may, for example, be like that shown as part of a servo-control system described in my copending application Serial No. 656,782, filed May 3, 1957, now abandoned, and entitled "Transistor Amplifier and Motor Load Using Conductive Feedback Circuit." The amplifier 152 may have its output connected to the motor 150 to effect rotation of the latter in one direction or the other. The motor 150 may be of the same servo type disclosed and described in my copending application identified.

The input to the amplifier 152 may be provided from an inductive coil 154 which may be variously positioned with respect to a magnetic core 156, the latter being magnetized by an A.C. exciting coil 158 which may, for example, have impressed upon it a low voltage of relatively low frequency, such as 13 volts at 400 cycles. The inductive coil 154 may be swung or turned mechanically from the null position shown to increase or decrease the induced voltage therein, and also to reverse the phase of such voltage. By a reversal of the phase of the induced voltage in the coil 154 there is effected a reversal of rotation of the motor 150, and an increase in the induced voltage in the coil 154 will result in greater energization of the motor 150 and vice versa, whereby the potentiometer brush 48 will be responsive, as regards its position on the coil 46, to a shifting from and return to null of the coil 154.

When the coil 154 is shifted in one direction from the null position (position of zero induced voltage) so as to have induced in it a voltage of one phase (which may be termed the "forward phase"), the potentiometer unit will be actuated in one direction to cause, for example, higher readings on the scales. If the coil 154 should, however, be shifted in the opposite direction from its null position to have a voltage induced in it of "reverse" phase, then the potentiometer unit would be actuated in the reverse direction, thereby to provide, for example, lower readings on the scales. The magnitude of the induced voltage will determine the speed of actuation of the potentiometer unit, to an extent.

By providing suitable control means, as for instance a potentiometer circuit by which the actuation of the potentiometer unit will automatically always tend to restore the inductive coil 154 to its null position (such means applying mechanical deflecting forces to the coil 154) the indicator pointers and scales of the potentiometer unit will indicate values of a variable, such as temperatures. Any suitable type of control means which makes the coil 154 return to null in response to actuation of the potentiometer unit may be utilized. For example, one such control means is illustrated and described in my copending patent application Serial No. 788,406, filed January 22, 1959, now Patent No. 2,986,934, and entitled "Condition-Responsive Device."

A means which is suitable for applying the above-mentioned mechanical deflecting forces to the coil 154 may comprise a mechanically coupled galvanometer-type instrument movement, and such an organization is disclosed and described in my Patent No. 2,854,619, dated September 30, 1958, and entitled "Transforming Unit."

The simple potentiometer circuit illustrated in FIG. 4 is explained as follows: To apply mechanical deflecting forces to the inductive coil 154 so as to shift the latter in either one direction or the other from its null position shown, an instrument movement of the galvanometer type having a deflection coil 160 may be mechanically coupled to the inductive coil 154. Such coupled coil and instrument movement are shown and described in detail in my patent above referred to.

The galvanometer coil 160 may be connected to a bridge 162, having resistive legs 164, 166, 168 and 169. The bridge leg 166 may be constituted as a sensing element which is responsive to temperature, whereby changes in the temperature will effect changes in the resistance of such leg. Accordingly, this leg has added to it the designation of an arrow, to indicate its sensing function. The junction between the legs 164 and 166 is connected to one terminal of a battery 170. The junctions between the legs 164, 168 on the one hand and the legs 166, 169 on the other hand are connected to the ends of the galvanometer coil 160. The remaining terminals of the leg 168, battery 170 and leg 169 may be brought to terminals 172, 174 and 176 respectively, and such terminals may constitute the terminals of the potentiometer unit of the present invention. For example, the center terminal 174 would be connected to the brush 48, and the two terminals 172 and 176 would be connected to the ends of the wire coil 46. With such organization, temperature changes affecting the resistance of the bridge leg 166 will cause an unbalance of the bridge, which will effect a deflection in one direction or the other of the galvanometer coil 160. This will in turn deflect the inductive coil 154 in one direction or the other from the null position shown, and such deflection will result in the induced voltage in the coil having either a forward phase or a reverse phase. Such induced voltage passing to the amplifier 152 will provide an energizing signal for the motor 150, to cause rotation of the latter in one direction or the other, and the motor 150 will now actuate the potentiometer unit, causing the brush 48 to traverse the coil 46 in one direction or the other. Traversal of the coil 46 by the brush 48 will now re-establish the balance of the bridge 162, and for such new condition of balance the potentiometer unit and particularly the brush 48 will have a new position, because of the altered resistance of the sensing element 166. This new position of the potentiometer unit will be indicated by the pointers and scales thereof, which may be calibrated in temperature values, thereby to indicate the temperature to which the sensing element 166 is subjected. The functioning of such a potentiometer system in general is well understood in the art, and is explained here briefly to illustrate the use of the potentiometer unit and control as provided by the invention.

It will now be seen from the foregoing that I have provided an improved and advantageous combination electrical control and/or indicator circuit and multi-turn potentiometer unit by which a very wide range of values of a variable condition may be taken into consideration, and by which accurate readings may be had throughout the said range, corresponding to relatively small or minute variations of the said condition. Further, the potentiometer unit which is of the multi-turn type is of simple construction and involves relatively few parts or components which may be easily and quickly assembled at relatively little cost. The functioning of the multi-turn potentiometer unit in spite of its small size and simplicity is reliable at all times, and the unit will operate satisfactorily throughout an extended period of use.

Variations and modifications may be made within the scope of the claims, and portions of the improvements may be used without others.

I claim:

1. A multi-turn potentiometer unit comprising a coil part including a multi-turn wire resistance coil having substantially the form of a helix and a drum-like coil form on which said wire coil is carried and with which it is coaxial; a screw-threaded member connected to said coil form and having its axis parallel to the axis of the coil and coil form; an electrical brush part including a brush engageable with the said coil; mounting means including a second screw-threaded member engaged with the first-mentioned member, movably connecting the said coil and brush parts with each other to enable relative traversal of the coil by the brush, said coil and screw-threaded members having pitch values related by a small factor; a transmission means connected with the coil and brush parts, for applying force to effect the relative traversal of the coil by the brush, said transmission means comprising a rotary driving shaft having a projecting driving lug and said brush part comprising a drum-like member having a recess receiving the said driving lug of the shaft whereby a sliding connection is established between the shaft and the drum-like member.

2. The invention as defined in claim 1 in which the first-mentioned screw-threaded member comprises a screw disposed within the coil and coaxial therewith, said screw having a longitudinal bore and said transmission shaft passing through the bore of the screw and having a bearing on the screw.

3. A multi-turn potentiometer unit comprising a coil part including a multi-turn wire resistance coil having substantially the form of a helix and a drum-like coil form on which said wire coil is carried and with which it is coaxial; a screw-threaded member connected to said coil form and having its axis parallel to the axis of the coil and coil form; an electrical brush part including a brush engageable with the said coil; and mounting means including a second screw-threaded member engaged with the first-mentioned member, movably connecting the said coil and brush parts with each other to enable relative traversal of the coil by the brush, said first-mentioned screw-threaded member comprising a screw disposed within the wire coil and having a pitch which is equal to the pitch of the convolutions of the coil, said electrical brush part comprising a drum-like member adapted to receive the coil within it and to surround the latter, and said brush comprising a leaf spring secured to a rim portion of the drum-like member and extending inwardly thereof for engagement with the coil.

4. The invention as defined in claim 3 in which there is a base on which the coil form is rigidly mounted, and in which there is a stop means comprising a fixed abutment disposed on the said base and a cooperable movable abutment carried by the drum-like member for limiting the turning of the latter when the brush reaches one end of the coil.

5. A multi-turn potentiometer unit comprising a coil part including a multi-turn wire resistance coil having substantially the form of a helix and a drum-like coil form on which said wire coil is carried and with which it is coaxial; a screw-threaded member connected to said coil form and having its axis parallel to the axis of the coil and coil form; an electrical brush part including a brush engageable with the said coil; mounting means including a second screw-threaded member engaged with the first-mentioned member, movably connecting the said coil and brush parts with each other to enable relative traversal of the coil by the brush, said coil and screw-threaded members having pitch values related by a small factor; a transmission means connected with the coil and brush parts, for applying force to effect the relative traversal of the coil by the brush, said transmission means comprising a rotary driving shaft having a projecting driving lug, and said brush part comprising a drum-like member having a recess receiving the said driving lug of the shaft whereby a sliding connection is established between the shaft and the drum-like member, said first-mentioned screw-threaded member comprising a screw disposed within the coil and coaxial therewith, said screw having a longitudinal bore, and said transmission shaft passing through the bore of the screw and having a bearing on the screw, said second screw-threaded member comprising a nut threaded on the said screw and rigidly affixed to the drum-like member, the driving lug of the transmission shaft comprising a pin disposed parallel with the shaft, and said drum-like member having an end wall in which the recess which receives the said driving lug is located.

6. The invention as defined in claim 5 in which there is a spring means secured to the drum-like member and engageable with the said driving lug, to normally prevent looseness of the lug in the said recess.

7. A multi-turn potentiometer unit comprising a coil part including a multi-turn wire resistance coil having substantially the form of a helix and a drum-like coil form on which said wire coil is carried and with which it is coaxial; a screw-threaded member connected to said coil form and having its axis parallel to the axis of the coil and coil form; an electrical brush part including a brush engageable with the said coil; mounting means including a second screw-threaded member engaged with the first-mentioned member, movably connecting the said coil and brush parts with each other to enable relative traversal of the coil by the brush, said coil and screw-threaded members having pitch values related by a small factor, certain convolutions of the coil having a smaller diameter than other convolutions whereby the resistance per turn of the coil is not uniform, thereby to enable a desired scale characteristic to be obtained by suitable proportioning of the convolution diameters.

8. The invention as defined in claim 7, in which the drum-like coil form has a peripheral surface of non-uniform diameter as it is traversed in an axial direction, thereby to effect the different diameters of the coil convolutions.

References Cited in the file of this patent

UNITED STATES PATENTS

| | | |
|---|---|---|
| 1,606,153 | Douglas | Nov. 9, 1926 |
| 1,744,592 | Terpening | Jan. 21, 1930 |
| 1,780,600 | Pullwitt | Nov. 4, 1930 |
| 2,200,128 | West | May 7, 1940 |
| 2,264,993 | MacShane | Dec. 2, 1941 |
| 2,859,316 | Miller | Nov. 4, 1958 |
| 2,871,326 | Weidenman | Jan. 27, 1959 |